UNITED STATES PATENT OFFICE.

CARLETON ELLIS, OF MONTCLAIR, NEW JERSEY, ASSIGNOR TO CLINTON S. LUTKINS, OF RYE, NEW YORK.

PREPARATION OF SYNTHETIC AMMONIA.

1,273,772.   Specification of Letters Patent.   Patented July 23, 1918.

No Drawing.   Application filed May 31, 1916.   Serial No. 100,835.

*To all whom it may concern:*

Be it known that I, CARLETON ELLIS, a citizen of the United States, and a resident of Montclair, in the county of Essex and State of New Jersey, have invented certain new and useful Improvements in the Preparation of Synthetic Ammonia, of which the following is a specification.

This application relates to the synthetic formation of ammonia by contacting a mixture of hydrogen and nitrogen with certain catalytic material and relates especially to the use of carbids and other similar compounds as catalytic agents in connection with said process.

In carrying out the invention in one preferred form, a mixture of nitrogen and hydrogen, well purified and particularly being free from oxygen or oxidizing agents, is passed over catalytic material of the character indicated and maintained at a temperature of 400–600° C. and held under a pressure ordinarily substantially below 100 atmospheres and preferably above 30 or 40 atmospheres and in particular for the catalyzer specifically hereinafter referred to, held between about 60–80 atmospheres, as within these limits a particularly satisfactory degree of hydridation and conversion is secured under effective conditions of operation, which render such critical pressures beneficial.

The mixture of hydrogen and nitrogen preferably should be in the proportion of 3:1 and as stated should be free from oxygen and also from catalyzer poisons such as sulfur and the like. In place of passing the mixture of the gases over the catalyzer the gases may be separately passed in alternation. Under these conditions less desirable results usually are obtained because of the complication in apparatus and the necessity of having fairly large containers under high pressure in which the catalytic material is contained, to serve as storage reservoirs of nitrids.

In the preferred form of the invention, the material of a catalytic nature is placed in a tube of considerable length with respect to diameter, and is packed therein in such a manner that the gases pass through the catalytic bed in a positive manner, so that an effective exposure of the catalytic surface is obtained without retardation due to slowness of diffusion as may easily occur in treating a thick mass of the catalyzer by passing gases over the upper surface of such mass.

The particular catalytic material employed herein is a carbid, especially the carbids of cobalt, nickel, copper, iron, palladium, platinum, chromium, manganese, titanium, molybdenum, vanadium, thorium, zirconium, etc., and still more particularly the carbids of cobalt, nickel, iron and manganese, which metals afford carbids that are well adapted for treatment with the mixed hydrogen and nitrogen gases as distinct from the alternate method of gas treatment, reacting to a greater or less degree to give nitrids or carbo-nitrids or similar bodies during the course of the reaction.

Illustratively, a catalyzer may be prepared by heating a mixture of equivalent proportions of nickel and cobalt hydrate with charcoal under reducing conditions producing a greater or less quantity of a carbid of the metal preferably in a finely-divided and porous state, which is peculiarly suited for the present purposes. Preferably an excess of charcoal over that required to form more or less of the carbid is caused to be present and serves as an hydrogen-occluding agent, which condition is useful in carrying out the present invention. A mixture of one part of nickel-cobalt hydrate or of iron-manganese hydrate, with two parts of charcoal heated in a reducing furnace to about 600° C. or higher, if necessary, furnishes a catalytic agent well adapted for the present purposes, whose nitrogen-occluding properties may be enhanced by the addition of vanadium, titanium, manganese, cerium and the like, using for example three parts of nickel carbid, and two parts of charcoal with one part of any of the metals mentioned.

The catalytic agent derived in this manner or in any other suitable way is usually prepared under conditions such that it may be exposed to the hydrogen and nitrogen gas mixture without any undue oxidation, and the gas mixture is allowed to pass over or preferably therethrough under the pressure and temperature indicated. A tubular container enables a suitable layer of the porous mass to be penetrated by the gas. If the catalytic agent is so prepared to produce granular particles, a porous mass is obtained, through which the gases readily pass and reaction takes place under effective conditions. A tube charged with such granular fragments does not greatly hinder the gas flow, yet all parts of the catalyzer are bathed with gas of practically uniform quality and instead of restricted local action a reaction throughout the catalytic material is better obtained.

Carbid of cerium may be employed alone or in conjunction with the foregoing. A mixture of one part of cerium carbid and two parts of carbon may be used.

The combination or association of a metal and a metalloidal element to form a catalyst for use at pressures under 100 atmospheres, preferably 60-80 atmospheres, is particularly desirable when using the catalyzer as porous masses through which the gas is forced or circulated.

What I claim is:—

1. The process of making synthetic ammonia which comprises passing a mixture of hydrogen and nitrogen through a catalytic agent comprising nickel-cobalt carbid.

2. The process of making synthetic ammonia which comprises bringing a mixture of hydrogen and nitrogen into contact with a catalytic agent comprising nickel-cobalt carbid and free carbon.

CARLETON ELLIS.